United States Patent
Barker, Jr. et al.

(10) Patent No.: US 7,349,380 B2
(45) Date of Patent: *Mar. 25, 2008

(54) SYSTEM AND METHOD FOR PROVIDING AN ADDRESSING AND PROXY SCHEME FOR FACILITATING MOBILITY OF WIRELESS NODES BETWEEN WIRED ACCESS POINTS ON A CORE NETWORK OF A COMMUNICATIONS NETWORK

(75) Inventors: Charles R. Barker, Jr., Orlando, FL (US); Robin U. Roberts, Orlando, FL (US)

(73) Assignee: Meshnetworks, Inc., Mailtland, FL (US)

( * ) Notice: Subject to any disclaimer, the term of this patent is extended or adjusted under 35 U.S.C. 154(b) by 1204 days.

This patent is subject to a terminal disclaimer.

(21) Appl. No.: 09/929,032

(22) Filed: Aug. 15, 2001

(65) Prior Publication Data
US 2003/0091012 A1  May 15, 2003

(51) Int. Cl.
*H04J 3/24* (2006.01)
(52) U.S. Cl. ...................... 370/349; 370/392
(58) Field of Classification Search ............... 370/254, 370/255, 310, 310.2, 312, 313, 328, 349, 370/386, 352–358, 389, 390, 392, 393, 395.31, 370/395.54, 400–204, 332, 331, 338, 395.52, 370/310.1; 709/242, 311; 455/433, 432.1, 455/436, 435.1, 442, 439, 435, 456
See application file for complete search history.

(56) References Cited

U.S. PATENT DOCUMENTS 4,494,192 A  1/1985  Lew et al. ............... 364/200

(Continued)

FOREIGN PATENT DOCUMENTS

CA  2132180  3/1996

(Continued)

OTHER PUBLICATIONS

Wong et al., "Soft Handoffs in CDMA Moile Systems", Dec. 1997, IEEE Personal Communications.

(Continued)

*Primary Examiner*—Brenda Pham
(74) *Attorney, Agent, or Firm*—Randi L. Karpinia; Joseph J. Buczynski (57) ABSTRACT

A communications network which is capable of effectively and efficiently handling mobility of wireless user terminals between access point nodes of a packet-switched network with minimal overhead and packet loss, and a method for using the same. The communications network employs a packet-switched core network and a plurality of access points coupled to the core network. Each access point is adapted to provide any user terminal with wireless communications access to the core network when that user terminal becomes affiliated with that access point. Each access point, as well as other nodes on the network such as a media server, DNS server and an IP gateway router, includes an address resolution cache which is adapted to store information representative of affiliation between the user terminals and the access points of the network. Each access point is adapted to deliver to the other access points a message indicating that a user terminal has changed its affiliation from another access point to that access point, to enable the other access points and core LAN nodes to update their respective address resolution cache based on the message. Preferably, an access point is adapted to issue the message over the core network as an address resolution request for an address, in particular, an IP protocol address, of the user terminal which has changed its affiliation to that access point.

12 Claims, 4 Drawing Sheets

U.S. PATENT DOCUMENTS

| | | | |
|---|---|---|---|
| 4,617,656 A | 10/1986 | Kobayashi et al. | 370/74 |
| 4,736,371 A | 4/1988 | Tejima et al. | 370/95 |
| 4,742,357 A | 5/1988 | Rackley | 342/457 |
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/313 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/309 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,901,362 A | 5/1999 | Cheung et al. | |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/364 |
| 5,958,018 A | 9/1999 | Eng et al. | |
| 5,987,011 A | 11/1999 | Toh | 370/280 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 409/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | van Bokhorst et al. | 455/343 |
| 6,208,870 B1 | 3/2001 | Lorello et al. | 455/466 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,477 B1 * | 8/2001 | Trompower et al. | 370/313 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,434,134 B1 * | 8/2002 | La Porta et al. | 370/338 |
| 6,535,493 B1 * | 3/2003 | Lee et al. | 370/329 |
| 2001/0053699 A1 | 12/2001 | McCrady et al. | 455/513 |

FOREIGN PATENT DOCUMENTS

| | | | |
|---|---|---|---|
| EP | 0513841 A2 | 11/1992 | |
| EP | 0513841 A3 | 11/1992 | |
| EP | 0627827 A2 | 12/1994 | |
| EP | 0924890 A2 | 6/1999 | |
| FR | 2683326 | 7/1993 | |
| WO | WO 9608884 | 3/1996 | |
| WO | WO 9724005 | 7/1997 | |
| WO | WO 9839936 | 9/1998 | |
| WO | WO 9912302 | 3/1999 | |
| WO | WO 0034932 | 6/2000 | |
| WO | WO 0110154 | 2/2001 | |
| WO | WO 0133770 | 5/2001 | |
| WO | WO 0135567 | 5/2001 | |
| WO | WO 0137481 | 5/2001 | |
| WO | WO 0137482 | 5/2001 | |
| WO | WO 0137483 | 5/2001 | |
| WO | WO 0235253 | 5/2002 | |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

"OSPF Version 2", Apr. 1998, Internet RFC/STD/FYI/BCP Archives.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

\* cited by examiner

SYSTEM AND METHOD FOR PROVIDING AN ADDRESSING AND PROXY SCHEME FOR FACILITATING MOBILITY OF WIRELESS NODES BETWEEN WIRED ACCESS POINTS ON A CORE NETWORK OF A COMMUNICATIONS NETWORK

CROSS-REFERENCE TO RELATED APPLICATIONS

Related subject matter is disclosed in a U.S. patent application Ser. No. 09/929,031 of Robin U. Roberts and Charles R. Barker, Jr. entitled "A System and Method for Performing Soft Handoff in a Wireless Data Network", filed on even date herewith, the entire contents of which is incorporated herein by reference.

BACKGROUND OF THE INVENTION

1. Field of the Invention

The present invention relates to a system and method for providing an addressing and proxy scheme for facilitating mobility of wireless nodes between wired access points on a core network of a communications network. More particularly, the present invention relates to a system and method for updating the address resolution caches of access nodes of a packet-switched network in response to a change in access node affiliation of a mobile node with minimal overhead and packet loss.

2. Description of the Related Art

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells".

Specifically, a terrestrial cellular network includes a plurality of interconnected base stations that are distributed geoghraphically at designated locations throughout the service area. Each base station includes one or more transceivers that are capable of transmitting and receiving electromagnetic signals, such as radio frequency (RF) communications signals, to and from user terminals, such as wireless telephones, located in its coverage area. The communications signals include, for example, voice data that has been modulated according to a desired modulation technique and transmitted as data packets. As can be appreciated by one skilled in the art, the transceiver and user terminals transmit and receive the data packets in multiplexed format, such as time-division multiple access (TDMA) format, code-division multiple access (CDMA) format, or frequency-division multiple access (FDMA) format, which enables a single transceiver at the base station to communicate simultaneously with several user terminals in its coverage area.

Because each base station can only handle a limited amount of communications signal traffic from the user terminals at any given time, the coverage area of a base station can vary depending on the amount of traffic that the base station is expected to experience. For example, the coverage area of a base station can be set to several miles in diameter in sparsely populated regions, such as rural regions having light wireless traffic, and can be set to less than a mile in diameter in densely populated regions, such as major metropolitan areas having heavy wireless traffic. The wireless communications network therefore must employ many base stations in heavily populated metropolitan areas in order for the network to adequately service the user terminals in those regions.

Each base station is also connected to one or more gateways that enable communication between the base station and other networks, such as the Internet and the public switched telephone network (PSTN). Accordingly, the base stations in the network enable the user terminals to communicate with each other, as well as with other destinations, such as telephony devices, in the PSTN.

Since wireless user terminals are typically mobile, it is common for a user terminal to travel between different base station coverage areas during use. When this occurs, the base station whose coverage area the user terminal is leaving must transfer or "handoff" the user terminal to the base station whose coverage area the user terminal is entering, so that the latter base station can become the base station via which the user terminal and network continue to communicate. In densely populated areas having many base stations with small coverage areas, this handoff process may need to occur several times during a short period of time as the user terminal travels between the different coverage areas.

Many techniques have been developed using the circuit-switched cellular infrastructure to minimize data packet loss during handoff while also minimizing overhead necessary to successfully perform the handoff. For example, a technique known as "hard handoff" refers to a break-before-make technique where the original connection is dropped before the new connection is established. On the other hand, "soft handoff" is a make-before-break technique that maintains multiple simultaneous connections to the user terminal during handoff, and only drops the original connection after the new connection is established. Examples of soft handoff techniques are described in a publication by Wong et al. entitled "Soft Handoffs in CDMA Mobile Systems", IEEE Personal Communications, December 1997, pp. 6-17, in a publication by Wong et al. entitled "A Pattern Recognition System for Handoff Algorithms", IEEE Journal on Selected Areas in Communications, Vol. 18, No. 7, July 2000, pp. 1301-1312, and in TIA document TIA/EIA-95-B entitled "Mobile Station-Base Station Compatibility Standard for Wideband Spread Spectrum Cellular Systems", Feb. 1, 1999, the entire contents of each of these documents being incorporated herein by reference.

With the arrival of the Internet in recent years, some wireless communications networks have moved away from the use of conventional cellular networks and their associated circuit switched routing techniques to improve voice communications services. Each mobile user terminal, telephony device, and any other device capable of communicating with the communications network, has a unique Internet Protocol (IP) address that uniquely identifies it from all other devices. A communications network employing IP sends data between destination points in digital form in discrete packets, rather than in the traditional circuit-committed protocols of the PSTN. Each of the data packets includes the sender's IP address as well as the intended receiver's IP address.

When a wireless user terminal, for example, transmits voice data to a base station of the communications network acting as the access point for the user terminal, a router associated with the base station reads the receiver IP address in the data packet. Each router includes a table of routing information, such as IP addresses of the devices local to the router, available routes, and so on. If the router recognizes from the receiver IP address that the data packet is intended for a telephony device in its immediate neighborhood or domain, the router forwards the data packet to that telephony device. However, if the router does not recognize the IP address as belonging to such a telephony device, the router forwards the data packet to an appropriate adjacent gateway in, for example, the Internet. The router of that gateway then reads the receiver IP address in the data packet, and either delivers the data packet to the appropriate telephony device in its domain, or forwards the data packet to another gateway. Once a router in a gateway recognizes the receiver IP address as belonging to a telephony device in its domain, the router in that gateway delivers the data packet to that telephony device.

It can be also noted that the use of IP to route data packets in a communications network enables the network to handle data other than voice data. For example, such IP techniques can be used to expand the versatility of the network to communicate audio, video or multimedia data between user terminals.

As in traditional cellular communications networks, wireless user terminals in a wireless communications network employing IP can be mobile, and can thus periodically change their access point to the network. Also, wireless user terminals can move outside their "home" network and become temporarily affiliated with a foreign network, and thus communicate via an access point on that foreign network.

Existing mobile data communications networks using IP techniques are based around conventional circuit-switched cellular infrastructures as discussed above, and therefore mask packet routing issues internal to their own networks. That is, when a user terminal moves its affiliation from one access point or base station to another within the network, the network can perform handoff techniques similar to those performed by a conventional wireless cellular network.

However, when a user terminal moves away from its home network and becomes affiliated with an access point on a foreign network, such topology changes must be communicated between routers in the home and foreign networks, so that the routers can update their respective routing tables as necessary, which results in substantial bandwidth-consuming overhead. Accordingly, it is generally agreed that this solution is too slow to handle user terminals that may be constantly mobile between networks, because routing changes must be propagated across the entirety of the connected network.

Another technique to handle the mobility of user terminals between networks without performing router updates is referred to as Mobile IP. A detailed description of Mobile IP is set forth in IETF document RFC 2002 entitled "IP Mobility Support", October 1996, the entire content of which is incorporated herein by reference. In accordance with the Mobile IP technique, a fixed access point on the mobile user terminal's home network, which can be referred to as a fixed network node, functions as a proxy agent (MIP home agent) for the mobile user terminal (mobile node) when the mobile node moves out of the home network and becomes affiliated with an access point (foreign node) on a foreign network. As understood in the Mobile IP art, the home network is the network at which the mobile node seems reachable to the rest of the Internet or to other networks by virtue of the mobile node's assigned IP address (home address), and a foreign network is the network to which the mobile node is attached when it is not attached to its home network.

Accordingly, when data packets are transmitted from another device to the mobile node, the Mobile IP home agent receives those data packets on the core home network behalf of the mobile node, and encapsulates those data packets. That is, the Mobile IP home agent incorporates each received IP data packet, less any preceding fields such as a media access control (MAC) header, inside another IP data packet, thereby making the fields within the original IP header of the IP data packet temporarily lose their effect. The Mobile IP home agent then tunnels those encapsulated data packet to an agent (Mobile IP foreign agent) on the foreign network to which the mobile node is currently attached. The Mobile IP foreign agent decomposes the capsule and sends the packet to the mobile node, which is currently local to the foreign agent.

Although the Mobile IP technique is reasonably capable of handling the mobility of user terminals between networks, the Mobile IP technique does increase overhead in the networks, since each data packet must be routed to the home network, encapsulated, and then rerouted to the foreign network. Also, the problems solved by Mobile IP can be viewed as those associated with a macro case of mobility in which nodes (user terminals) are mobile between core networks. Mobile IP is unsuitable for handling a micro case of mobility in which user terminals are mobile between wired access points in a single core network.

One solution for managing mobility within a circuit-switched cellular network has been proposed and is referred to as Cellular IP. A description of Cellular IP is set forth in a publication by Andras G. Valko entitled "Cellular IP: A New Approach to Internet Host Mobility", ACM Computer Communication Review, January 1999, the entire content of which is incorporated herein by reference. Although this solution is somewhat suitable for handling mobility in circuit-switched cellular networks, the technique is specific to the circuit-switched infrastructure of the network.

As can further be appreciated by one skilled in the art, while Mobile IP is suitable for handling cases of user terminal mobility between networks, Mobile IP is deficient in handling problems with packet routing that may occur within a packet-switched core network when a mobile node moves and is handed off from one base station to another. A communications network employing a packet-switched core network is described, for example, in U.S. Pat. No. 7,072, 650 entitled "Ad Hoc Peer-to-Peer Mobile Radio Access System Interfaced to the PSTN and Cellular Networks", issued on Jul. 4, 2006, the entire content of which is incorporated herein by reference. An example of a wireless local area network (LAN) having mobility is set forth in IEEE Standard 802.11, Aug. 20, 1999, the entire content of which is incorporated herein by reference. Specifically, Mobile IP is incapable of effectively operating under the additional constraints imposed by a packet-switched core network having wired access point nodes that are typically connected using bandwidth-constrained leased lines and which cannot tolerate the additional overhead of twice-routed Mobile IP packets. Furthermore, the low-cost access point nodes also typically cannot tolerate the processor-intensive decomposition of encapsulated packets that is performed during Mobile IP.

Accordingly, a need exists for a system and method capable of effectively and efficiently handling mobility of wireless user terminals between access point nodes of a packet-switched network with minimal overhead and packet loss.

SUMMARY OF THE INVENTION

An object of the present invention is to provide a system and method capable of effectively and efficiently handling mobility of wireless user terminals between access point nodes of a packet-switched network with minimal overhead and packet loss.

Another object of the present invention is to provide a system and method for updating the address resolution caches of network nodes of a packet-switched network in response to a change in affiliation of a mobile node with an access node using existing network protocols.

These and other objects are substantially achieved by providing a communications network, adapted for use with mobile wireless user terminals, comprising a packet-switched core network and a plurality of access points coupled to the core network, and a method for using the same. Each access point is adapted to provide any user terminal with wireless communications access to the core network when that user terminal becomes affiliated with that access point. Each access point, as well as other nodes on the network such as a media server, DNS server and an IP gateway router, includes an address resolution cache which is adapted to store information representative of affiliation between the user terminals and the access points of the network. Each access point is adapted to deliver to the other access points a message indicating that a user terminal has changed its affiliation from another access point to that access point, to enable the other access points to update their respective address resolution caches based on the message. Preferably, an access point is adapted to issue the message over the core network as an address resolution request, such as an address resolution protocol (ARP) request, for an address, in particular, an IP protocol address, of the user terminal which has changed its affiliation to that access point.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
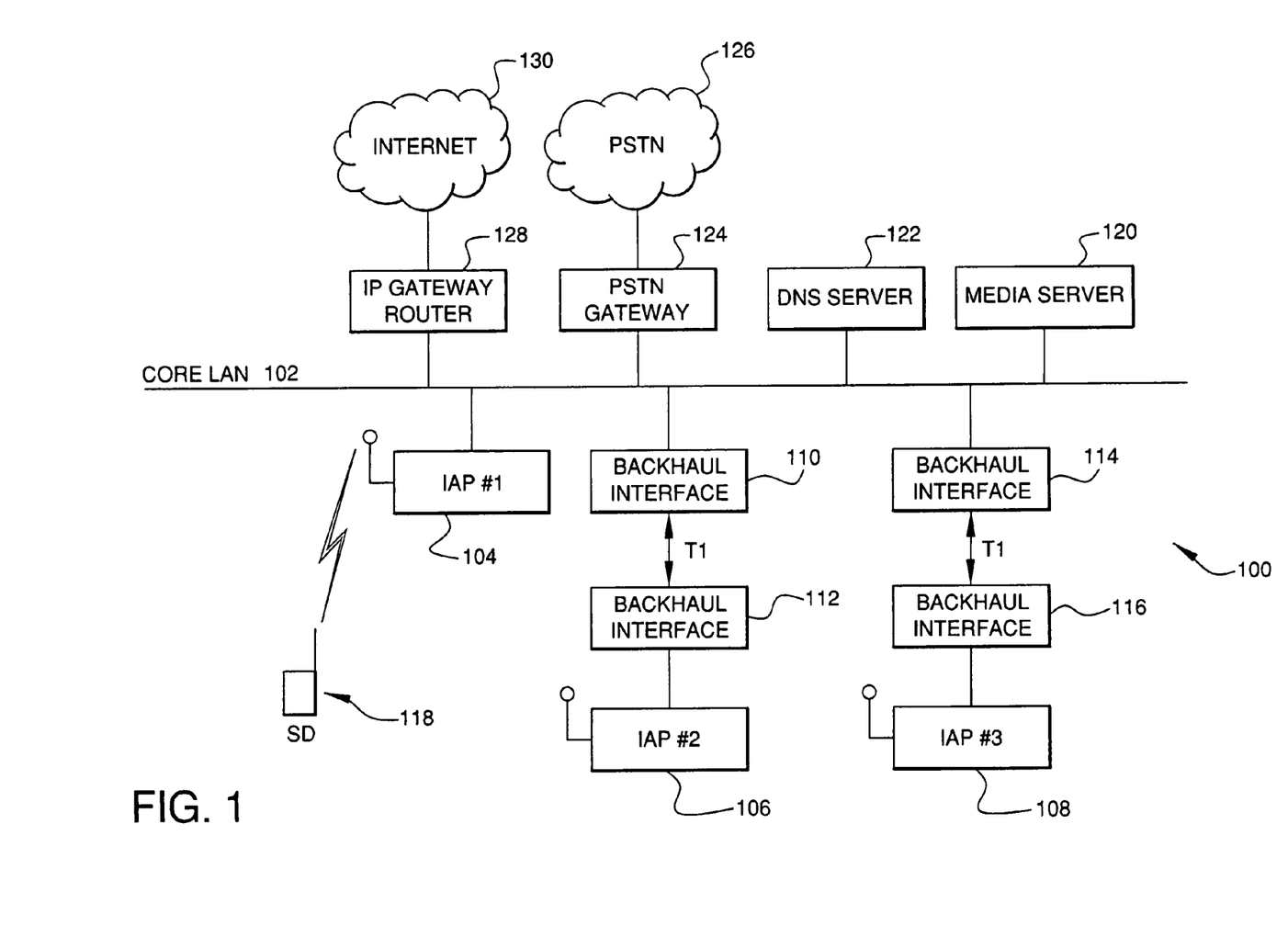
FIG. 1 is a block diagram of an example of a wireless communications network employing a system and method for handling user terminal mobility within the network according to an embodiment of the present invention.

FIG. 1 is a block diagram illustrating an example of a wireless communications network 100 employing a system and method for handling user terminal mobility within the network according to an embodiment of the present invention. As shown, network 100, which can be referred to as a "core network", includes a core local access network (LAN) 102 which provides the wired infrastructure for the network 100. A plurality of intelligent access points (IAP) 104, 106 and 108 are coupled to and communicate with the core LAN 102. As illustrated in this example, IAP 104 is directly coupled to the core LAN 102, while IAP 106 is coupled to core LAN 102 via backhaul interfaces 110 and 112 and a T1 connection, and IAP 108 is coupled to core LAN 102 via backhaul interfaces 114 and 116 and a T1 connection. However, any suitable backhaul technology, such as T3, fiber and microwave, can be used. Hence, the IAPs 104, 106 and 108 need not be fixed, but rather, can be configured to move and can communicate with the core LAN 102 via a wireless backhaul, such as a microwave backhaul.

Each IAP 104, 106 and 108 is an infrastructure device containing at least one transceiver and at least one embedded processor. In this example, each IAP 104, 106 and 108 further includes a 10/100 Base-T Ethernet connection. However, the IAPs 104, 106 and 108 can include any type of high-speed connection suitable for coupling to the core LAN 102. An IAP 104, 106 and 108 is configured to remain in a fixed location, such as on a building rooftop or in a building ceiling, and is provided with a permanent source of power, such as alternating current or any other suitable power source.

As described in more detail below, an IAP 104, 106 and 108 operates to provide access for subscriber devices, such as mobile user terminals 118, to wired services provided by the network 100. Each IAP 104, 106 and 108 also provides a respective fixed and known position and location reference, relay and wireless routing for user terminals 118 within its area of coverage, and the principle network management interface with transceivers in wireless routers and subscriber devices, such as user terminals 118. Each wired IAP 104, 106 and 108 can be referred to generally as a "fixed node" on the network 100, while the mobile user terminal 118 can be referred to as a "mobile node". The wired IAP 104, 106 and 108 can also function as access points to the network 100 for user terminals 118 forming an ad-hoc network as described, for example, in U.S. Pat. No. 7,072,650 reference above, as in U.S. Pat. No. 5,943,322 to Mayor, the entire contents of each being incorporated by reference herein.

The network 100 further may include a media server 120 for delivering types of media such as video and multimedia data to the core LAN 102, and a domain name server (DNS) 122 for translating Internet domain names into Internet Protocol (IP) addresses in a manner as known in the art. The network 100 may also include a PSTN gateway 124 which provides data access between the network 100 and the PSTN 126, and an IP gateway router 128 which provides data access between the network 100 and the Internet 130.

Further details of the network 100 and its operation will now be described. For purposes of this discussion, the terms "IAP" and "node" or "fixed node" will be used interchangeably, as well as the terms "user terminal" and "mobile node". The wired IAPs 104, 106 and 108 on the core LAN 102 are all fully connected to a single virtual segment. As can be appreciated by one skilled in the art, all IAPs 104, 106 and 108 (fixed nodes) on the virtual segment are directly accessible from any other node at the logical link layer. IP routing is not used to reach any other node on the virtual segment. The IP subnet for this virtual segment is large enough to encompass all of the IAPs 104, 106 and 108, and all mobile nodes 118 in a single broadcast domain. The virtual segment may include media access control layer (MAC-layer) bridges and switches (not shown) between the IAPs 104, 106 and 108, as needed, to filter unicast frames from using bandwidth on non-required links.

The wired IAPs 104, 106 and 108 will, by definition, have two network interfaces, one of which is connected to the network via a wire-line link, and the other being a wireless transceiver. Both of these interfaces will have IP addresses from the core network's IP subnet. An IAP 104, 106 and 108 must then retain an IP routing table indicating that the IP of the wireless transceiver interface is reachable on that interface, while all other IP addresses on that subnet are reachable directly on the wired interface. IP's outside the core network's subnet are reachable via the core network's directly accessible IP gateway router 128.

Figure 2:
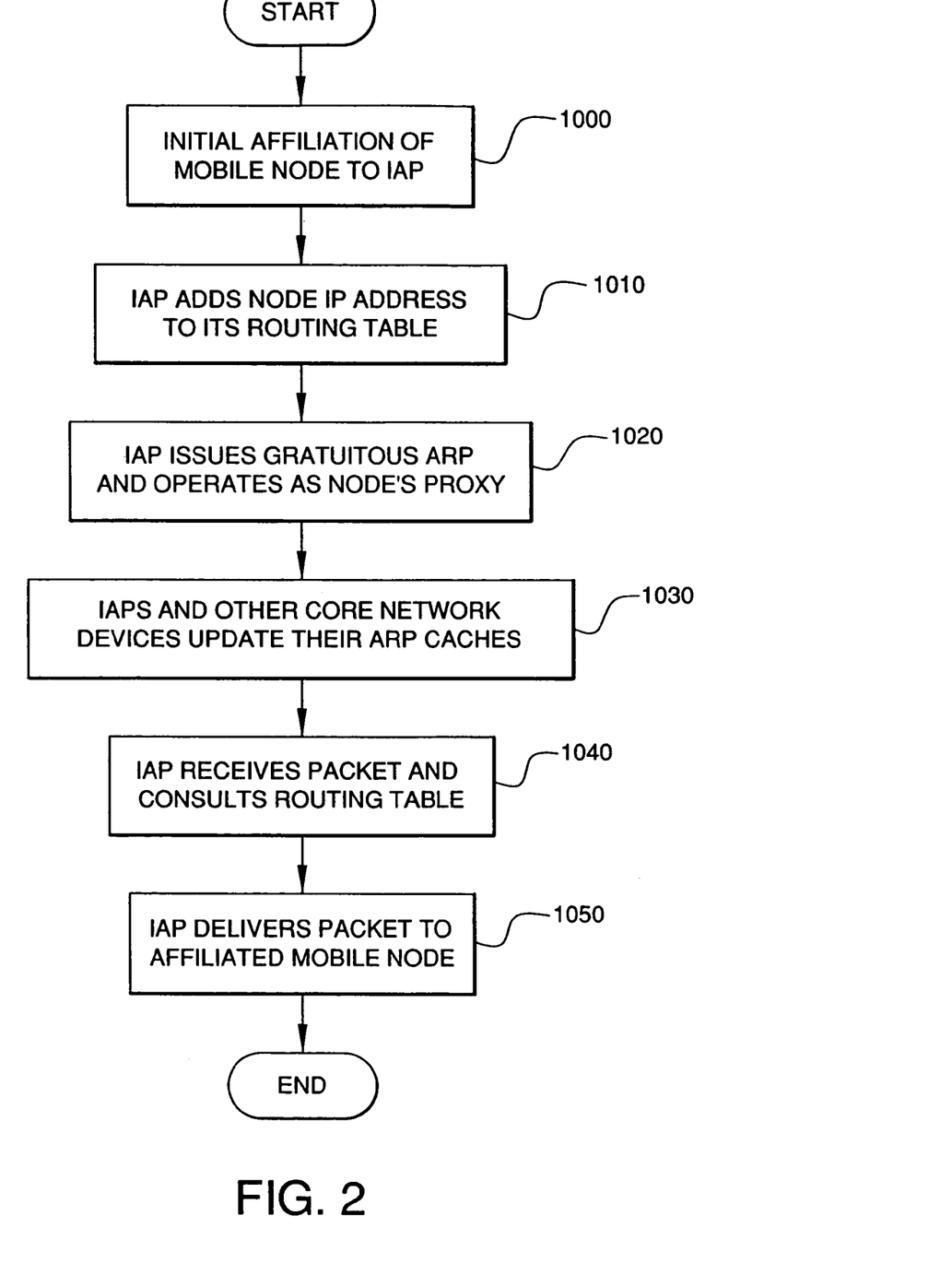
FIG. 2 is a flowchart illustrating an example of operations performed by the network shown in FIG. 1 when a mobile user terminal affiliates with an access point.

The process by which a mobile node affiliates with an IAP will now be described with reference to FIGS. 1 and 2. As a mobile node (user terminal) 118 affiliates to a wired IAP 104, 106 or 108, the wired IAPs 104, 106 and 108, will add that mobile node's IP address to their own respective routing tables, indicating that this mobile node is directly accessible via the wireless transceiver. This overrides the default subnet-wide entry only for this particular mobile node. It is noted that the mobile node 118 can affiliate with IAP 104 via a direct communication link, or via other mobile nodes in the ad-hoc network already affiliated with IAP 104. As shown in FIG. 1 and in step 1000 in FIG. 2, mobile node 118 initially affiliates to IAP 104. Accordingly, in step 1010, IAP 104 adds the IP address of mobile node 118 to its own routing table, indicating that this mobile node 118 is directly accessible via the wireless transceiver of IAP 104. Upon doing so, wired IAP 104 must begin acting as the mobile node's proxy on the core network 100 in step 1020. This implies that IAP 104 will answer to address resolution requests, such as address resolution protocol (ARP) requests, on the core network 100 for the mobile node's IP address as if it were the mobile node 118. Other nodes on the core network 100, such as IAPs 106 and 108, as well as media server 120, DNS server 122 and IP gateway router 124, will then associate the IP address of the mobile node 118 to the MAC address of the wired interface of the wired IAP 104 via their respective ARP caching mechanisms in step 1030.

Furthermore, as indicated in step 1040, when a packet destined for the mobile node 118 is received by the IAP 104, the IAP 104 must consult its IP routing table and forward the packet on the proper interface, which is the wireless transceiver of the IAP 104, as indicated in step 1050. This allows the wired IAP 104 to be a "point of presence" on the core network 100 to represent the mobile node 118 as a proxy.

Figure 3:
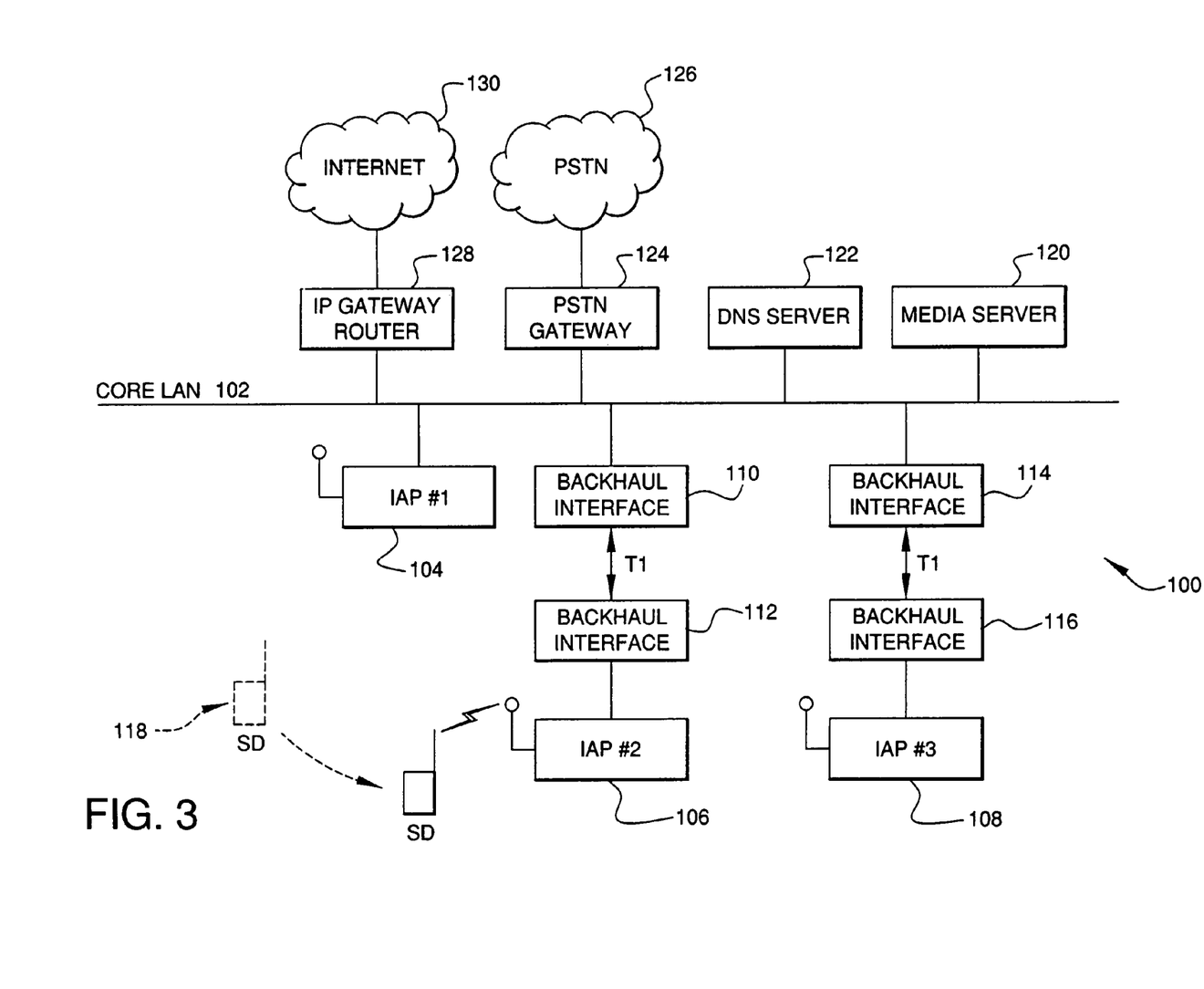
FIG. 3 is a block diagram of the network shown in FIG. 1 in which a mobile user terminal changes its affiliation from one access point to another.

It is also necessary for the network 100 to handle the movement of nodes between wired IAPs as will now be described. As shown in FIG. 3 and indicated in step 1100 in FIG. 4, if a mobile node 118 should affiliate to a new IAP, for example, IAP 106, after having received traffic at an original IAP 104, other nodes on the network (e.g., IAP 108, media server 120, DNS server 122 and IP gateway router 124) would be unaware of the change unless certain measures are taken. Hence, their address resolution protocol (ARP) caches would associate the IP of the mobile node 118 to the MAC address of the original IAP 104, so packets from an uninformed node (e.g., IAP 108, media server 120, DNS server 122 or IP gateway router 124) would never reach the new IAP 106.

Figure 4:
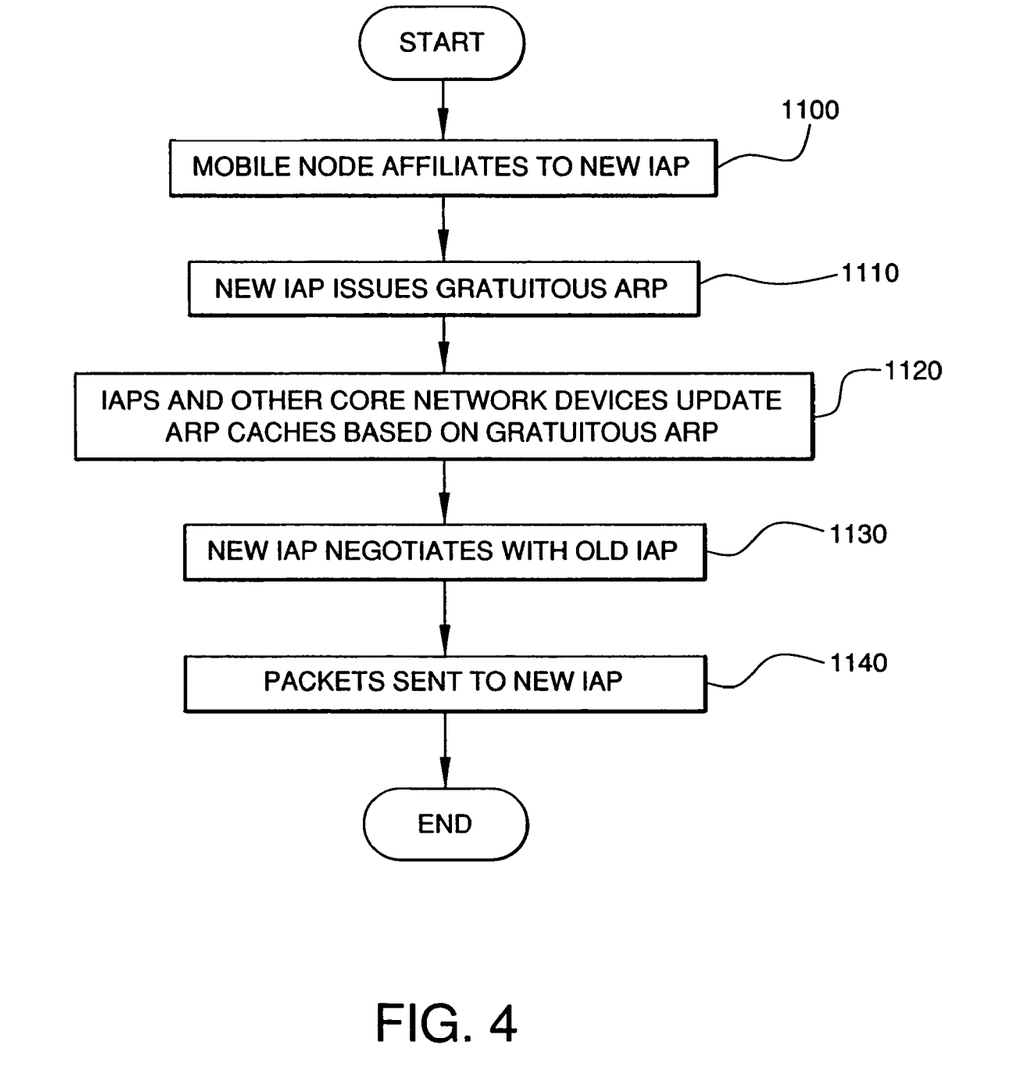
FIG. 4 is a flowchart illustrating an example of operations performed by the network shown in FIG. 1 when the mobile user terminal changes its access point affiliation as shown in FIG. 3.

To circumvent this problem, a procedure known as "gratuitous ARP" can be performed in accordance with an embodiment of the present invention. That is, as indicated in step 1110, the IAP with which the mobile node 118 has newly become associated (i.e., IAP 106) issues an ARP request on network 100 for the mobile node's own IP address. This forces an update to the ARP caches of other nodes (e.g., IAPs 104 and 108, media server 120, DNS server 122 and IP gateway router 124) on the network 100 to the nodes new point of presence, as indicated in step 1120. Further descriptions of ARP caches and gratuitous ARPs are set forth on page 62 of IETF document RFC 2002 referenced above, as well as on page 20 of IETF document RFC 1009 entitled "Requirements for Internet Gateways", June 1987, and in IETF document RFC 826 entitled "An Ethernet Address Resolution Protocol", November 1982, the entire contents of each of these documents are incorporated herein by reference. Also, other types of ARP-like mechanisms can be used to update the address resolution caches of the other nodes (IAPs 104 and 108, media server 120, DNS server 122 and IP gateway router 124), such as those mechanisms described in IETF document RFC 2461 entitled "Neighbor Discovery for IP Version 6 (Ipv 6)", December 1998 and in IETF document RFC 2332 entitled "NBMA Next Hop Resolution Protocol", April 1998, the entire contents of these documents being incorporated herein by reference.

Hence, other nodes (IAPS 104 and 108, media server 120, DNS server 122 and IP gateway router 124)) will now associate the IP address of the mobile node 118 to the MAC address of the new IAP 106. As further indicated in step 1130, the new IAP 106 negotiates with the IAP 104 with which the mobile node 118 was previously affiliated to remove the explicit route for the mobile node 118 from this original IAP's IP routing table. For example, the gratuitous ARP may serve as the negotiation, or separate messaging may be used. An example of this technique is described in U.S. Pat. No. 7,072,323 of Robin U. Roberts et al. entitled "A System and Method for Performing Soft Handoff in a Wireless Data Network", issued on Jul. 4, 2006. Accordingly, as indicated in step 1140, packets on the core network 100 for the mobile node 118 will now be sent by default to the wired interface of IAP 106.

This solution provides for virtual presence of mobile nodes 118 on a core network 100 and the full mobility of those nodes between access points on that network. When combined with Mobile IP techniques as discussed in the Background section above, nodes 118 may transit any IAPs, regardless of whether they are on the home network or a foreign network, only using Mobile IP techniques when transitioning between a home network and a foreign networks.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A communications network for use with mobile wireless user terminals, said network comprising:
   a packet-switched core network;
   a plurality of access points within a same broadcast network and coupled to said core network, each said access point providing any said user terminal with communications access to said core network when said any user terminal becomes affiliated with said access point, and including an address resolution protocol cache for storing information representative of affiliation between said user terminals and said access points, and each said access point including means for updating its address resolution protocol cache with an Internet protocol address of a said user terminal when that said user terminal becomes affiliated with said access point, and further including means for issuing an address resolution protocol request which causes other said access points to update their respective address resolution protocol cache to indicate that said user terminal has changed its affiliation to said access point; and at least one of a media server, DNS server and an IP gateway router, each including a respective an address resolution protocol cache for storing information representative of affiliation between said user terminals and said access points and is updateable based on said address resolution protocol request.

2. A communications network as claimed in claim 1, wherein:
said each access point issues said address resolution protocol request over said core network.

3. A communications network as claimed in claim 1, wherein:
said access point with which a said user terminal is affiliated includes a wireless transceiver for transmitting a received data packet to said user terminal via a wireless communications link.

4. A communications network as claimed in claim 1, wherein:
each said access point includes a wireless transceiver for transmitting and receiving data packets to and from a said user terminal affiliated therewith via a wireless communications link.

5. A communications network as claimed in claim 1, wherein:
each said access point provides any said user terminal with communications access to said core network when said user terminal is participating in an ad-hoc network.

6. An access point, coupled to a communications network for providing mobile wireless user terminals with communications access said network, said access point comprising:
a wireless transceiver for transmitting and receiving data packets to and from a said wireless user terminal affiliated with said access point when said user terminal is participating in an ad-hoc network;
an address resolution protocol cache for storing information representative of affiliation between said user terminals and said access points; and
an affiliation indicator for updating the address resolution protocol cache with an Internet protocol address of a said user terminal when that said user terminal becomes affiliated with said access point, and for issuing an address resolution protocol request which causes other access points within a same broadcast network and coupled to said communications network to update their respective address resolution protocol cache to indicate that said user terminal has changed its affiliation from said another access point to said access point.

7. A method of handling mobility of wireless user terminals for use with a communications network including a packet-switched core network and a plurality of access points coupled to said core network, said method comprising:
provide a said user terminal with communications access to said core network via said access point when said user terminal becomes affiliated with said access point;
storing information representative of affiliation between said user terminals and said access points in a respective address resolution protocol cache of each said access point;

controlling said access point to update its address resolution protocol cache with an Internet protocol address of a said user terminal when that said user terminal becomes affiliated with said access point, and to issue an address resolution protocol request to indicate to the other said access points that said user terminal has changed its affiliation from said another said access point to said access point;

updating respective said address resolution protocol caches of the other said access points within a same broadcast network based on said address resolution protocol request to indicate said change in affiliation of said user terminal; and updating respective address resolution protocol caches of at least one of a media server, DNS server and an IP gateway router of said network based on said address resolution protocol request.

8. A method as claimed in claim 7, wherein:
said controlling step controls said access point to issue said address resolution protocol request over said core network.

9. A method as claimed in claim 7, further comprising:
controlling said access point with which a said user terminal is affiliated to transmit a received data packet to said user terminal via a wireless communications link.

10. A method as claimed in claim 7, wherein:
said providing step includes providing said user terminal with communications access to said core network when said user terminal is participating in an ad-hoc network.

11. A method for providing mobile wireless user terminals with communications access to a packet-switched network, said method comprising:
controlling an access point on said packet-switched network to transmit and receive data packets to and from a said wireless user terminal affiliated with said access point when said user terminal is participating in an ad-hoc network;
controlling said access point to store information representative of affiliation between said user terminals and access points on said packet-switched network in an address resolution cache of said access point;
controlling said access point to update its address resolution protocol cache with an Internet protocol address of a said user terminal when that said user terminal becomes affiliated with said access point, and to issue an address resolution protocol request to indicate to other said access points within a same broadcast network and coupled to said packet-switched network indicating that said user terminal has changed its affiliation from said another access point to said access point; and
controlling said other access points to update their respective address resolution protocol cache based on said address resolution protocol request.

12. A method as claimed in claim 11, wherein:
said third controlling step controls said access point to issue said address resolution protocol request over said packet-switched network.

* * * * *